United States Patent [19]

Aoyama

[11] Patent Number: 4,903,589
[45] Date of Patent: Feb. 27, 1990

[54] BREAD BAKING APPARATUS

[75] Inventor: Michishige Aoyama, Nagoya, Japan

[73] Assignee: Kabushiki Kaisha Toshiba, Kawasaki, Japan

[21] Appl. No.: 269,126

[22] Filed: Nov. 9, 1988

[30] Foreign Application Priority Data

Nov. 27, 1987 [JP]  Japan ................................ 62-300692

[51] Int. Cl.⁴ .............................................. A47J 27/00
[52] U.S. Cl. ......................................... 99/348; 99/331; 99/468; 366/98; 366/145
[58] Field of Search ................. 99/348, 352, 353, 331, 99/467, 468, 470, 473, 474, 475, 476, 483, 484; 366/144, 145, 146, 149, 69, 98, 341; 426/27

[56] References Cited

U.S. PATENT DOCUMENTS

| | | | |
|---|---|---|---|
| 4,538,509 | 9/1985 | Ojima et al. | 99/352 |
| 4,762,057 | 8/1988 | Hirota et al. | 99/468 |
| 4,776,265 | 10/1988 | Ojima | 99/348 |

Primary Examiner—Timothy F. Simone
Attorney, Agent, or Firm—Foley & Lardner, Schwartz, Jeffery, Schwaab, Mack, Blumenthal & Evans

[57] ABSTRACT

A bread baking apparatus includes a case having an upper open end closed and opened by a lid, a heater for heating the atmosphere in the case, a dough container disposed in the case so that a space is circumferentially defined between the case and the dough container, an electric motor for driving a kneading blade disposed in the dough container, an electric fan disposed outside the case and energized for a predetermined period during the first half of a baking step, and a microcomputer for controlling the motor, the fan and the heater.

8 Claims, 3 Drawing Sheets

BREAD BAKING APPARATUS

BACKGROUND OF THE INVENTION

1. Field of the Invention

This invention relates to a bread baking apparatus including a container for containing dough and a heating element for heating the container so that the dough in the container is baked.

2. Description of the Prior Art

A conventional automatic home bakery is provided with a microcomputer which controls operation steps of kneading dough stuffs by rotation of a blade to thereby obtain dough, fermenting yeast contained in the dough, baking the dough with a heater, and cooling the bread.

When the bread is baked with the above-described home bakery, a depression is often formed in the upper central portion of the bread. The reason for the forming of such a depression is as follows: The heating of the dough progresses from its circumferential portion adjacent to the circumferential wall of the container to its central portion. Accordingly, the circumferential portion of the dough first hardens and then, the hardening progresses from its circumferential portion to its central portion. Consequently, since the central portion of the dough is rendered softer than the circumferential portion thereof, the upper central portion of the dough is depressed owing to gravity. Such a depression degrades the appearance of the bread baked.

SUMMARY OF THE INVENTION

Therefore, an object of the present invention is to provide a bread baking apparatus which can supply bread having no depression in the upper central portion thereof.

In order to achieve the object, the bread baking apparatus in accordance with the invention comprises a container for containing dough, a heating element for heating the container so that the dough contained in the container is baked, fan means for directing a current of air to the container so that an upper surface of the dough contained in the container is dried, and control means for controlling the fan means so that the same is operated for a predetermined period of time during the first half of a baking step.

After the baking step is started, wherein the container is heated so that the dough therein is baked the fan means is operated for the predetermined period of time during the first half of the baking step, preferably, in an initial stage of the baking step.

The current of air directed to the container by the fan means serves to facilitate the drying of the dough surface and, accordingly, the dough surface hardens fast. The hardened surface of the dough prevents the upper central portion of the dough from being depressed owing to gravity in the baking step which is followed by a cooling step.

The bread baking apparatus in accordance with a first modification of the invention comprises a case, a container disposed in the case for containing dough so that a space is circumferentially defined therebetween, the container having an upper open end, a heating element provided in the case for heating the container so that the dough contained therein is baked, fan means for directing a current of air to the interior of the case so that the drying of the dough is facilitated, and control means for controlling the fan means so that the same is operated for a predetermined period of time during the first half of a baking step.

When the fan means is operated in the baking step, air is introduced to the space between the case and the container and further into the container from its upper open end, thereby facilitating the drying of the dough surface.

The bread baking apparatus in accordance with a second modification of the invention comprises a case having an upper open end, a container disposed in the case for containing dough so that a space is circumferentially defined therebetween and having an upper open end, the container being put into and out of the case through the upper open end of the case, a heating element provided in the case for heating the container for closing and opening the upper open end of the case, the lid being provided with an air inlet opening opposite to the upper end of the container and an air passageway communicating to the air inlet opening, fan means for directing a current of air to the air passageway of the lid so that air is introduced to the interior of the container through the air inlet opening of the lid, and control means for controlling the fan means so that the same is operated for a predetermined period of time during the first half of a baking step.

The air introduced by the fan means is fed to the interior of the container through the air passageway formed in the lid closing the upper end of the case and the air inlet opening, thereby facilitating the drying of the dough surface.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Two embodiments of the present invention will now be described with reference to the accompanying drawings.

Figure 1:
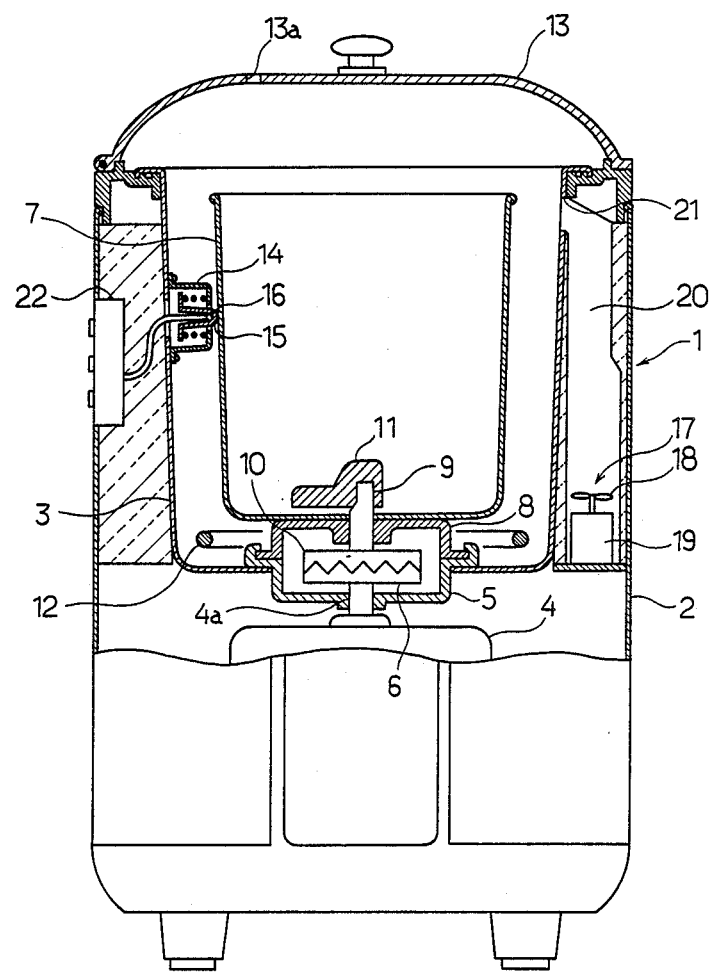
FIG. 1 is a partially cross sectional side view of a home bakery embodying the present invention.

Referring first to FIG. 1 illustrating an overall construction of the home bakery, a body 1 comprises outer and inner cases 2 and 3. An electric motor 4 is mounted on a bottom wall of the outer case 2 so that a rotational shaft 4a thereof is upwardly extended. A shallow dish-shaped receiver 5 is inserted in a central opening formed in a bottom wall of the outer case 2 and secured to the bottom wall thereof. The rotational shaft 4a of the electric motor 4 is extended through an opening formed in the central bottom of the receiver 5. A joint member 6 is fixed to the end of the rotational shaft 4a. A cylindrical container 7 for containing dough is provided in the inner case 3 such that a space is defined by the inside circumferential wall of the container 7. Another receiver 8 is fixed to the bottom of the container 7. The receiver 8 has a central opening through which a drive shaft 9 is rotatably extended. The drive shaft 9 is further extended into the interior of the container 7 through an opening formed in the bottom of the container 7. A joint member 10 is secured to the lower end of the drive shaft 9. A kneading blade 11 is detachably attached to the upper end of the drive shaft 9 so as to be positioned over the bottom wall of the container 7. The receiver 8 is detachably attached to the receiver 5 of the inner case 3 by way of a bayonet mechanism known in the art, thereby placing the container 7 in the inner case 3. When the receiver 8 is attached to the receiver 5, the joint member 10 is coupled to the joint member 6.

A heater 12 serving as a heating element has a generally annular configuration and is provided in the inner case 3 so as to be placed in the vicinity of the lower portion of the container 7 provided in the inner case 3. A lid 13 is attached to the body 1 for rotative movement so as to close an upper open end of the inner case 3. The lid 13 has an air hole 13a. A support frame 14 is secured to the inside circumferential wall of the inner case 3. A heat sensing member 15 is provided in the support frame 14 and urged inwardly of the the inner case 3 by a spring (not shown). One end of the heat sensing member 15 is brought into contact with the outer circumferential wall of the container 7. A temperature sensor such as a thermistor 16 is provided on the end of the heat sensing member 15 so as to sense the temperature of a content of the container 7 through the circumferential wall of the container 7. Fan means 17 comprises a fan 18 and an electric motor 19 for driving the fan 18. The fan means 17 is provided at the lower portion of an air passageway 20 formed between the outer and inner cases 2 and 3 so that a current of air is directed upwardly along the air passageway, as seen in FIG. 1. An air outlet opening 21 is formed in the upper portion of the inner case 3. The air passageway 20 is terminated at the air outlet opening 21. An operation box 22 is fixed on the circumferential wall of the outer case 2. A microcomputer 23 serving as control means and other electronic parts are enclosed in the operation box 22.

Figure 2:
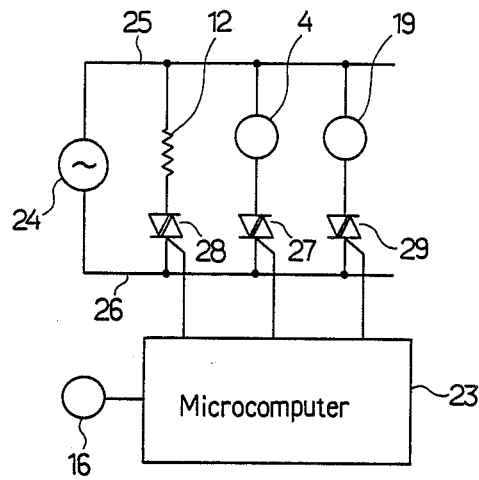
FIG. 2 is an electrical circuit diagram of a control section of the home bakery.

Referring now to FIG. 2, an electrical circuit arrangement of the operation control section will be described. Reference numeral 24 indicates an AC power supply to which power supply lines 25 and 26 are connected. The motor 4, heater 12 and motor 19 are connected between the power supply lines 25 and 26 through bi-directional triode thyristors or triacs ("TRIAC" is a registered trademark owned by General Electric Company) 27, 28 and 29, respectively. The gates of the triacs 27-29 are connected to output terminals of the microcomputer 23, respectively. The thermistor 16 is connected to an input terminal of the microcomputer 23. The microcomputer 23 is designed to control the heater 12, motors 14 and 19, as will be hereafter described.

Figure 3:
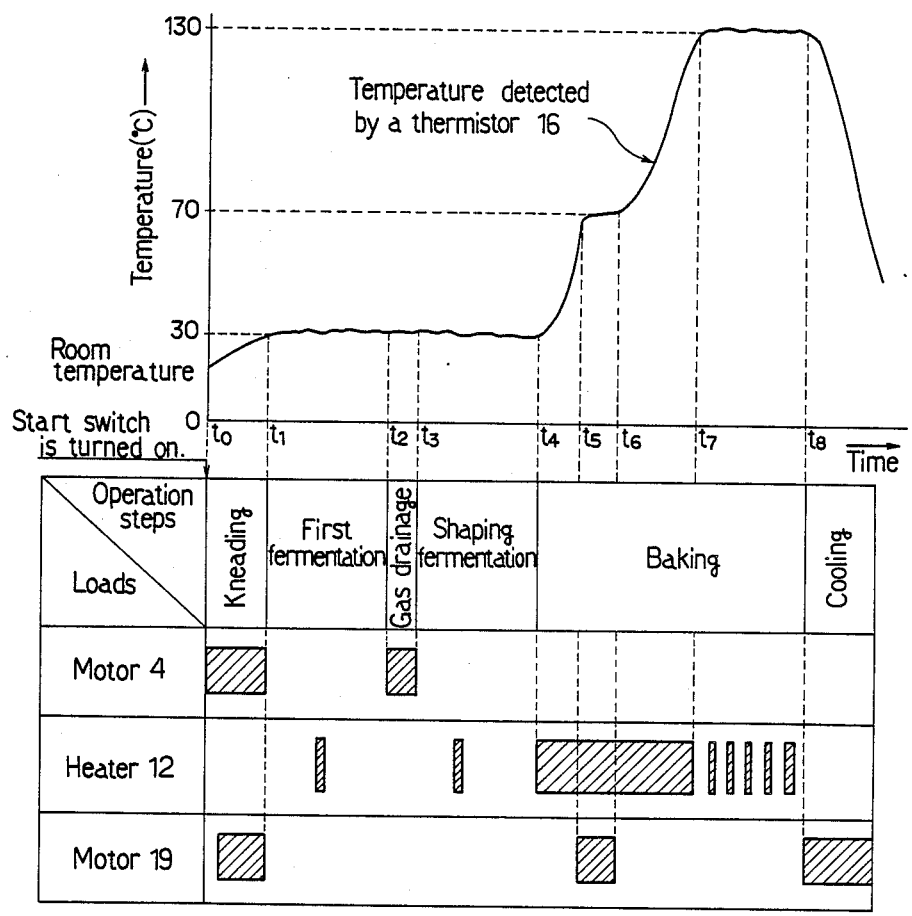
FIG. 3 is a time chart for explaining the operation of the home bakery.

Operation of the above-described home bakery will now be described with reference to FIGS. 1, 2 and 3. In FIG. 3, portions of oblique lines show periods for which the motors 4, 19 and heater 12 are energized. Dough stuffs such as a predetermined amount of wheat flour, yeast, and water are put into the container 7. Then, when a start switch (not shown) provided on the operation box 22 is turned on, the microcomputer 23, as the control means, control is the motors 4, 19 and heater 12 so that operation steps are sequentially performed, as shown in FIG. 3. More specifically, upon turn-on of the start switch, a gate signal is supplied from the microcomputer 23 to the triac 27 and accordingly, the motor 4 is energized, thereby rotating the kneading blade 11. The dough stuffs are kneaded so that dough is obtained. Thus, execution of the kneading step is started (at time $t_0$). In the kneading step, the temperature of the dough stuffs is increased owing to frictional heat generated as the result of the operation of the blade 11. An excessively increased temperature of the dough stuffs causes the yeast to over-ferment. In order to limit the temperature increase of the dough stuffs to the value of approximately 30° C., a gate signal is supplied from the microcomputer 23 to the triac 29 to thereby energize the motor 19 of the fan means 17. Consequently, relatively cool air is introduced into the inner case 3. The motors 4 and 19 are deenergized after elapse of a predetermined period of time (at time $t_1$). Subsequently, a fermentation step for fermenting the yeast in the dough obtained is started. The fermentation step includes a first fermentation stage, a gas drainage stage, and a shaping fermentation stage. The fermentation step is executed sequentially through these stages in the condition that the temperature of the dough is maintained at approximately 30° C. under control of the microcomputer 23. Should the dough temperature sensed by the thermistor 16 be less than 30° C. in the first fermentation stage (from time $t_1$ to $t_2$), the triac 28 is supplied with the gate signal from the microcomputer 23, thereby energizing the heater 12. Upon completion of the first fermentation stage (at time $t_2$), the motor 4 is energized to rotate the kneading blade 11 for the drainage of gas induced in the dough for a predetermined period of time. Upon completion of the gas drainage stage (at time $t_3$), the shaping fermentation stage is executed for a predetermined period of time in the same manner as in the first fermentation. Thus, upon completion of the fermentation step, the baking step is started (at time $t_4$). In the baking step, the heater 12 is continuously energized for the period from time $t_4$ to time $t_7$ so that the temperature of dough sensed by the thermistor 16 is increased to the value of 130° C. suitable for the baking of dough (a baking completion set temperature). Subsequently, the dough contained in the container 7 is heated in the condition that the heater 12 is energized and deenergized so that the temperature of dough sensed by the thermistor 16 is maintained at the approximate value of 130° C. for the period from time $t_7$ to $t_8$. For a period of time in an initial stage of the first half of the baking step, that is, at time $t_5$ at which the dough temperature sensed by the thermistor 16 reaches an intermediate temperature, for example, 70° C., the motor 19 is energized for a predetermined period from time $t_5$ to $t_6$, for example, for five or six minutes. Consequently, the motor 19 is energized to direct a current of air to the interior of the inner case 3, whereby temperature of the container 7 and the dough are prevented from being increased temporally or caused to be increased relatively moderately. Accordingly, the temperature sensed by the thermistor 16 is maintained at the value of approximately 70° C. for the predetermined period of time. When the baking step is completed at time $t_8$, the motor 19 is energized for execution of the cooling step in which baked bread and the container 7 are cooled with air introduced into the inner case 3. The dough temperature, 70° C. in the embodiment, at which the motor 19 is driven to direct a current of air to the container 7 corresponds to the approximate temperature at which the yeast becomes extinct.

According to the home bakery described above, when the temperature sensed by the thermistor 16 reaches approximately 70° C. in the first half of the baking step, the fan means 17 is driven to direct a current of air to the container 7 placed in the inner case 3. Consequently, the upper surface of the dough which is being baked is dried and hardened. Accordingly, since the hardening of the upper surface of the bread baked is quickened, a depression is not formed in the upper surface of the bread. Furthermore, since the fan means 17 is driven in the first half of the baking step, increase of an amount of the heat supplied to the container 7 by the heater 12 may be temporally restricted, temperature difference between the inside and surface of the dough contained in the container 7 is reduced, thereby supplying bread the inside of which is baked uniformly as well as the surface portion thereof.

Although the fan means 17 is driven when the value of temperature sensed by the thermistor 16 reaches approximately 70° C., the thermistor 16 may be driven when the temperature sensed by the thermistor 16 reaches the value ranging from 65° C. to 75° C., which range is the lower limit for the fermentation of yeast. In this case, too, the same effect may be achieved as in the foregoing embodiment.

Figure 4:
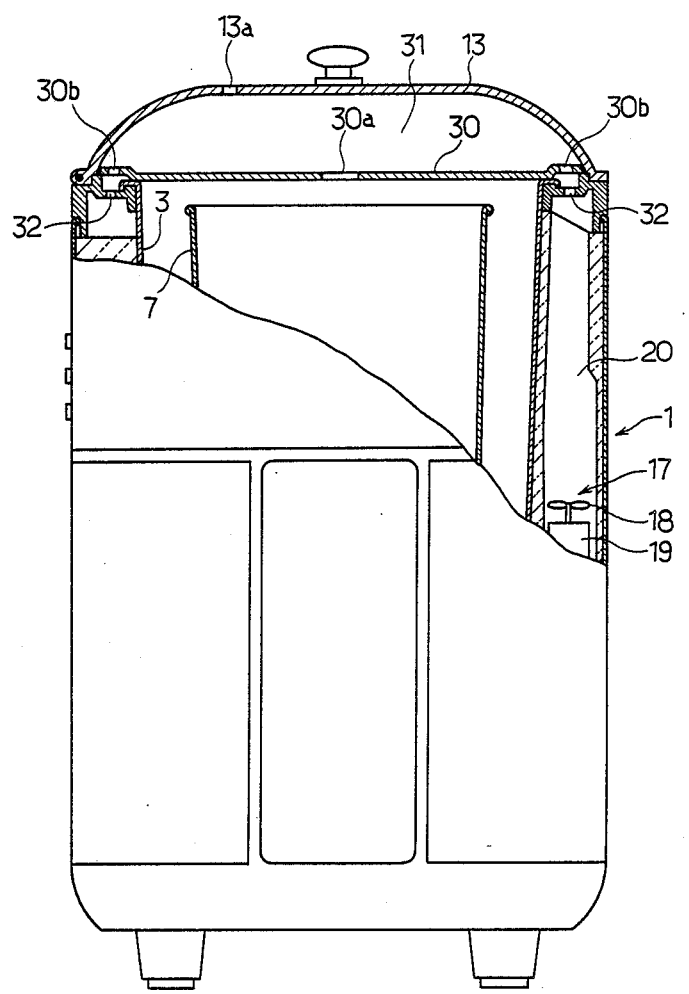
FIG. 4 is a partially cross sectional side view of a home bakery in accordance with a modification of the invention.

FIG. 4 shows a home bakery of a second embodiment. A lid 13 is provided with an inside panel 30 which defines a hollow interior 31 with the lid 13. The hollow interior 31 is utilized as an air passageway. The inside panel 30 has an air outlet opening 30a formed so as to be opposite to the upper open end of the container 7. The inside panel 30 also has a communicating opening 30b opposite to the upper end of the air passageway 20. When the fan means 17 is driven, air is directed to the interior of the container 7 through the air passageway 20, opening 32, communicating opening 30b, another air passageway 31, and air outlet opening 30a.

The bread baking apparatus of the present invention may be applied to an apparatus which is only provided with a baking function.

The foregoing disclosure and drawings are merely illustrative of the principles of the present invention and are not to be interpreted in a limiting sense. The only limitation is to be determined from the scope of the appended claims.

What is claimed is:

1. A bread baking apparatus comprising:
   (a) a container for containing dough and yeast;
   (b) a heating element for heating said container so that the dough contained therein is baked;
   (c) fan means for directing a current of air to said container so that an upper surface of the dough contained in said container is dried; and
   (d) control means for controlling said fan means so that the driving of said fan means is started when the temperature of the dough reaches a predetermined temperature during a temperature increasing stage of the dough after the starting of baking, said predetermined temperature ranging from 65° C. to 75° C.

2. A bread baking apparatus as claimed in claim 1, wherein said fan means is driven for a predetermined period which is less than a period needed for the temperature of the dough to reach a baking temperature.

3. A bread baking apparatus as claimed in claim 1, wherein the increase of temperature of said container is interrupted or moderated for the period during which said fan means is driven.

4. A bread baking apparatus as claimed in claim 1, wherein the predetermined intermediate temperature is approximately 70° C.

5. A break baking apparatus as claimed in claim 2, wherein the drive period of said fan means ranges from approximately five to six minutes.

6. A bread baking apparatus comprising:
   (a) a case;
   (b) a container for containing dough and yeast, said container having an open upper end and disposed in said case so that a space is circumferentially defined therebetween;
   (c) a heating element provided in said case for heating said container so that the dough contained therein is baked;
   (d) fan means for directing a current of air to the interior of said case so that the drying of the dough surface is facilitated; and
   (e) control means for controlling said fan means so that the driving of said fan means starts when the temperature of the dough reaches a predetermined temperature during a temperature increasing stage of the dough after start of the baking step, said predetermined temperature ranging from 65° C. to 75° C.

7. A bread baking apparatus comprising:
   (a) a case having an open upper end;
   (b) a container disposed in said case for containing dough and yeast, with a space circumferentially defined therebetween, said container having an open upper end, said container being put into and taken out of said case through the open upper end of said case;
   (c) a heating element provided in said case for heating said container so that the dough contained therein is baked;
   (d) a lid for closing and opening the open upper end of said case, said lid having an air outlet opening opposite the upper open end of said container and an air passageway communicating with the air outlet opening;
   (e) fan means for directing a current of air to the air passageway of said lid so that air is introduced to the interior of said container through the air outlet opening of said lid; and
   (f) control means for controlling said fan means so that the driving of said fan means starts when the temperature of the dough reaches a predetermined temperature during a temperature increasing stage of the dough after the starting of the baking step, said predetermined temperature ranging from 65° C. to 75° C.

8. A bread baking apparatus comprising:
   (a) a case having an open upper end;
   (b) a lid for closing and opening the open upper end of said case;
   (c) a container disposed in said case for containing dough and yeast, a space being circumferentially defined therebetween, said container having an open upper end and a kneading blade disposed at the lower interior thereof;
   (d) a heating element provided outside of said container, in said case, for heating the air in said case;
   (e) an electric motor provided outside of said case for driving the kneading blade;

(f) fan means located outside of said case, the driving of said fan means starting when the temperature of the dough reaches a predetermined temperature during a temperature increasing stage of the dough after start of the baking step, so that air outside said case is introduced to the interior of said case through the open upper end thereof, the predetermined temperature ranging from 65° C. to 75° C.; and (g) control means for controlling said motor for the kneading of the dough and controlling said heating element and said fan means for the fermenting of the yeast and the baking of the dough.

* * * * *